(12) United States Patent
Chicheportiche et al.

(10) Patent No.: US 8,930,640 B2
(45) Date of Patent: Jan. 6, 2015

(54) MULTIPROCESSOR COMPUTER SYSTEM WITH REDUCED DIRECTORY REQUIREMENT

(76) Inventors: Jordan Chicheportiche, Rue de Moulin Vert (FR); Said Derradji, Esplanade Raoul Follereau (FR)

( * ) Notice: Subject to any disclaimer, the term of this patent is extended or adjusted under 35 U.S.C. 154(b) by 660 days.

(21) Appl. No.: 12/322,807

(22) Filed: Feb. 6, 2009

(65) Prior Publication Data
US 2009/0248989 A1  Oct. 1, 2009

(30) Foreign Application Priority Data
Feb. 7, 2008  (FR) ...................................... 08 00653

(51) Int. Cl.
  *G06F 13/00*  (2006.01)
  *G06F 12/08*  (2006.01)
(52) U.S. Cl.
  CPC ........ *G06F 12/0826* (2013.01); *G06F 12/0817* (2013.01)
  USPC ......................................................... 711/148
(58) Field of Classification Search
  USPC ......................................................... 711/141
  See application file for complete search history.

(56) References Cited

U.S. PATENT DOCUMENTS

| | | | |
|---|---|---|---|
| 5,634,110 A | 5/1997 | Laudon | |
| 6,085,295 A * | 7/2000 | Ekanadham et al. | 711/145 |
| 7,373,466 B1 * | 5/2008 | Conway | 711/156 |
| 2002/0112132 A1 | 8/2002 | Lesmanne | |
| 2004/0123047 A1 | 6/2004 | Hum | |
| 2008/0301379 A1 * | 12/2008 | Pong | 711/148 |

FOREIGN PATENT DOCUMENTS

| | | | |
|---|---|---|---|
| EP | 0856796 A | 8/1998 | |
| FR | 1233342 A1 | 8/2002 | G06F 12/08 |

* cited by examiner

*Primary Examiner* — Sean D Rossiter
(74) *Attorney, Agent, or Firm* — Russell W. Guenthner (57) ABSTRACT

The invention has application in implementation of large Symmetric Multiprocessor Systems with a large number of nodes which include processing elements and associated cache memories. The illustrated embodiment of the invention provides for interconnection of a large number of multiprocessor nodes while reducing over the prior art the size of directories for tracking of memory coherency throughout the system. The embodiment incorporates within the memory controller of each node, directory information relating to the current locations of memory blocks which allows for elimination at a higher level in the node controllers of a larger volume of directory information relating to the location of memory blocks. This arrangement thus allows for more efficient implementation of very large multiprocessor computer systems.

23 Claims, 9 Drawing Sheets

PRIOR ART

FIG. 7

PRIOR ART

FIG. 8

MULTIPROCESSOR COMPUTER SYSTEM WITH REDUCED DIRECTORY REQUIREMENT

CROSS REFERENCE TO RELATED APPLICATIONS

This application claims priority under 35 U.S.C. Section 119 to:
French Application Number: 08 00653
Country FR
Holder: Bull SAS
  Bull SAS Ref. No. 03988
Title: Système informatique multiprocesseur
Inventors: CHICHEPORTICHE, Jordan; and DERRADJI, Said
Filing Date Feb. 7, 2008
which is hereby incorporated by reference.

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The present invention relates, in the domain of computers, to multiprocessor systems formed by the union of modules (also called nodes) each having several processors. These systems are commonly called SMP (Symmetric Multi-Processing, or Symmetric multiprocessor). The invention more particularly relates to a multiprocessor computer system with several nodes, featuring a structure divided into modules enabling the number of the processors in the system to be increased by increasing the number of modules.

Computer systems of low processing power comprise a single processor with which a memory, input/output devices and mass storage systems (hard disks, optical storage, magnetic tape disks and similar) are associated. When the processing power required is greater, beyond what it is possible to obtain using a monoprocessor computer system, multiple processors must be coupled together by one or more buses.

Figure 6:
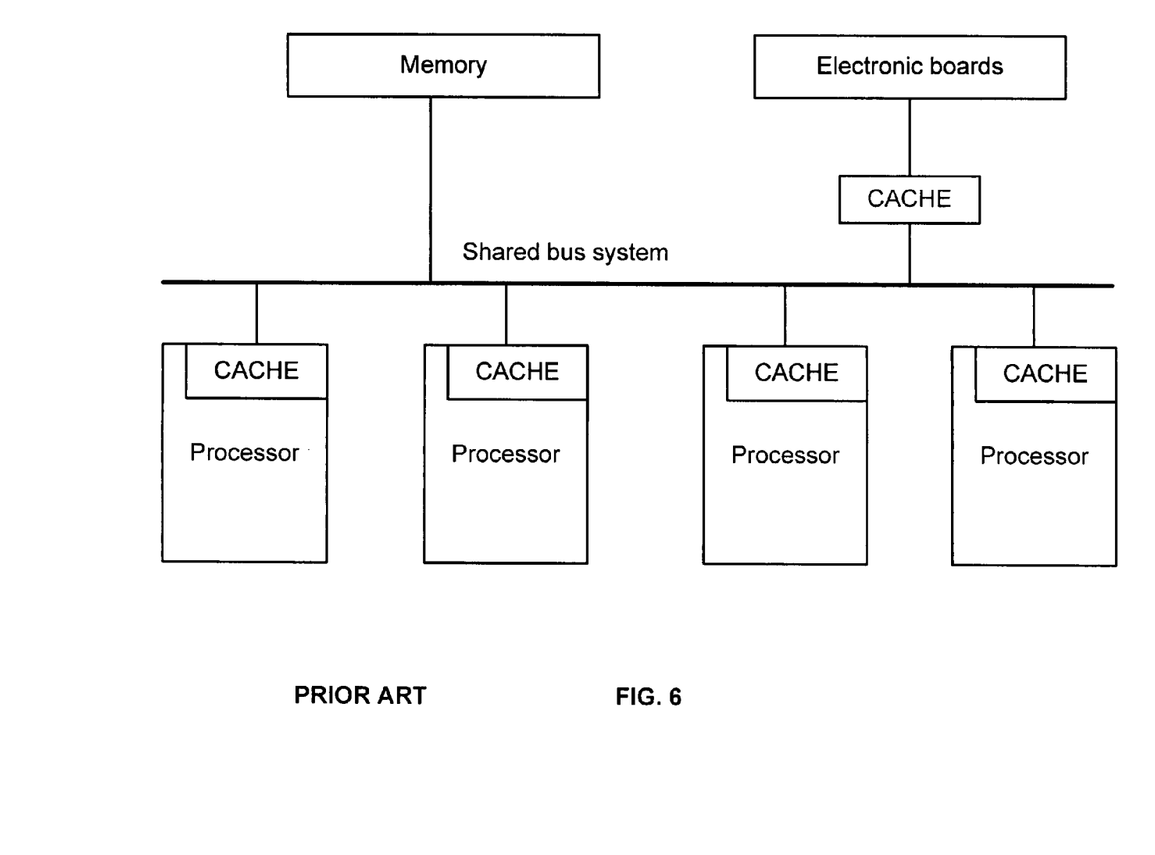
FIG. 6 shows an example of conventional SMP architecture.

In a manner known, SMP type systems feature a structure partitioned into modules or nodes. The SMP (symmetric multiprocessing) technology is a method used in the multiprocessor network servers. In the case of an SMP server, the memories (and all the internal peripheral devices) are shared between all the processors that use them jointly. A computer architecture of the SMP type is an architecture that consists in multiplying the processors within a computer, in such a manner as to increase the computing power. The increase in the number of processors enables a greater number of processes of the user system or kernel to be executed simultaneously, by allocating one or other of the available processors. FIG. 6 illustrates an example of conventional SMP architecture. The publication document "STARFIRE: Extending the SMP Envelope" IEEE Micro, January-February 1998, Vol. 18 1st edition, pages 39-49, illustrates a type of SMP architecture with a crossbar switching. It is also known, for example by "The Stanford FLASH Multiprocessor" (21st ISCA Proceedings) or by U.S. Pat. No. 7,047,372, a type of SMP architecture using directories referencing the memory addresses used by the different processors. In the existing range of NovaScale® servers marketed by the BULL Company, servers are provided with an SMP architecture that uses this type of directory.

The SMP type systems with several nodes require a cache consistency protocol to monitor, over time, the hosting locations of the memory addresses used by the different processors. This protocol is necessary in this type of system that uses a cache associated with each of the processors. As several processors can share a variable, it is possible to have several copies in several caches of the value of the variable that is shared in the memory. If one of the copies is modified by one of the processors, updates must be carried out in all the other caches where there is a copy of this variable if consistency is to be maintained. In SMP servers such as the NovaScale® 5005 servers of BULL Company, several processors forming the respective nodes are associated and the consistency of the data processed in the system is provided notably using an electronic chip typically grouping different identifiable processing agents of a cache consistency protocol. In an SMP system, a node can be defined as a topological group of agents/processors. From a functional viewpoint, the exchanges between agents from different nodes necessarily pass via an interconnection controller called a node controller NC. Physically, the different agents can be grouped on a same chip and therefore share the same links to communicate with the rest of the system.

The consistency protocols advantageously use directories to keep track of the shared information. In each node of such an SMP system known in the prior art as discussed herein with reference to FIG. 5, a memory controller (15) comprises a directory (150) managing the memory addresses within the node, and a node controller (20) that comprises a first directory (16) managing remote memory addresses that have been imported into the node (imported directory) and a second directory (17) managing the local addresses that have been exported to other nodes (exported directory). The shared information relating to a determined memory block (memory address) generally comprises a cache status of the block and the identity of the other nodes that share this block. Typically, the directories are distributed among all the nodes.

Another example of a prior art system is described in U.S. Pat. No. 7,017,011 which is assigned to the same assignee as named herein. This patent discloses a coherence controller adapted for connection to a plurality of processors equipped with a cache memory and with at least one local main memory. The coherence controller including a cache filter directory comprising a first filter directory SF designed to guarantee coherence between the local main memory and the cache memories of the local module. The cache filter directory includes a complementary filter directory ED which is handled like the cache filter directory SF for keeping track of the coordinates, particularly the addresses, of the lines or blocks of the local main memory copied from the local module into an external module and guarantees coherence between the local main memory and the cache memories of the local module and the external modules. Thus, the ED directory makes it possible to know if there are existing copies of the memory of the local module outside the module, and to propagate requests of local origin to the other modules or external modules only judiciously.

The cache consistency protocol is now well known and will not be described herein. However, in order to explain the problem of the systems of the prior art that the present invention proposes to resolve, it is necessary to explain the operation of this consistency protocol within the multiprocessor systems known by the prior art. The U.S. Pat. No. 7,130,969 is cited herein as an example of a multiprocessor system featuring directories for the cache consistency. The MESI or MESIF (Modified, Excluded, Shared, Invalid, Forward) protocol of the INTEL Corporation is a non-restrictive example of cache consistency protocol (reference can notably be made to the document U.S. Pat. No. 6,922,756 for the MESIF protocol).

The prior SMP type systems implemented the directories in two ways: "full directory" and "sparse directory" systems. Full directory systems store the shared information as close as possible to each block of the main memory; these systems waste a significant amount of physical memory as a directory input is required for all the blocks of the main memory even if the block has no associated cache in the system.

Sparse directory systems are preferred as they store in memory blocks only the shared information that is stored in cache at the level of remote processors. Hence, the quantity of memory used to maintain the consistency of the shared information is directly proportional to the number of memory blocks that can be stored in the cache memory of a basic processor.

The directories correspond to tables specifying, for each of the cache blocks of the main memory, one or more processors for which a copy is stored in cache memory. Directories typically provided for each of the nodes are stored in the integrated memory (in the cache) of a node controller. Separate memories of the RAM type, for example SRAM (Static Random Access Memory (RAM)) or DRAM (Dynamic RAM) are used for the storage of the sparse directory systems. These separate memories are interfaced with the directory controller of the node controller NC.

The directories can therefore be used by the node controllers to send messages called "snoops" that are used to consult the system memories susceptible of having a copy in order to determine the status of the data of the cache of the processors. The directories enable a filtering of the messages to be implemented to address only the relevant processors. It is understood that this construction enables data traffic to be reduced significantly.

Figure 5:
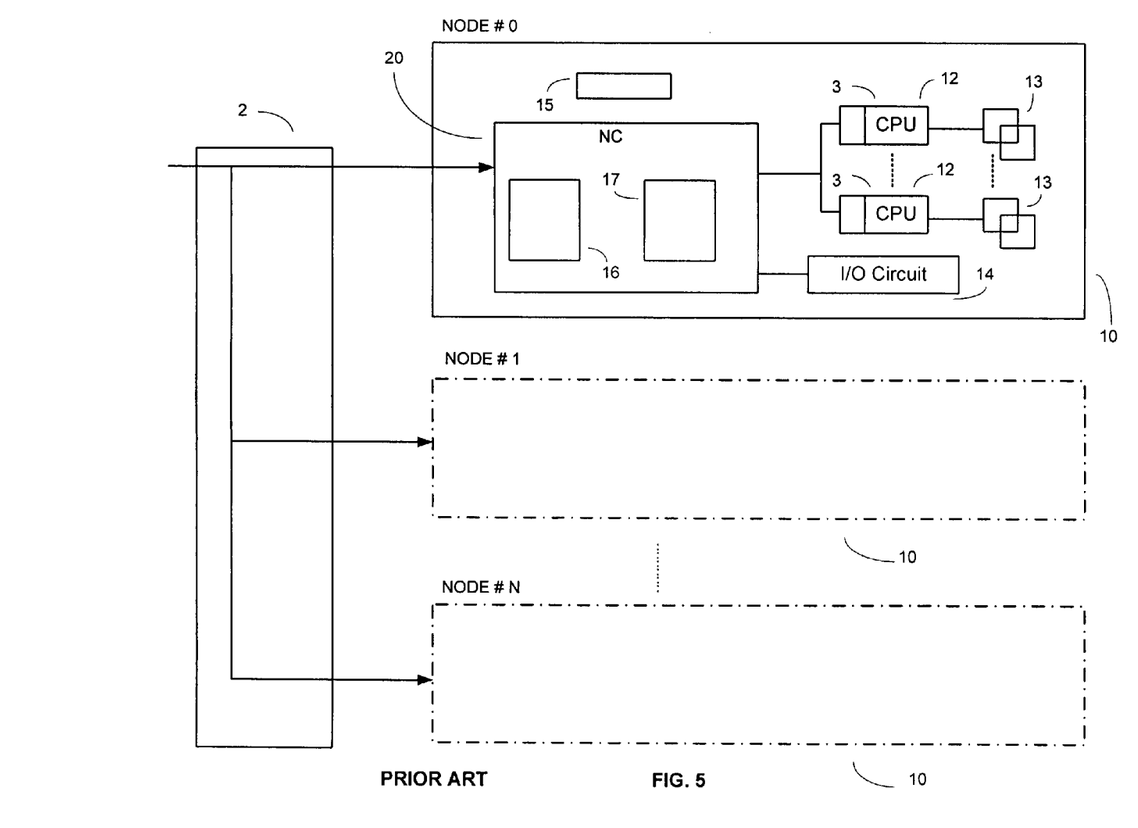
FIG. 5 is a diagram showing a configuration example of a server with several nodes encountered in the prior art.
Figure 7:
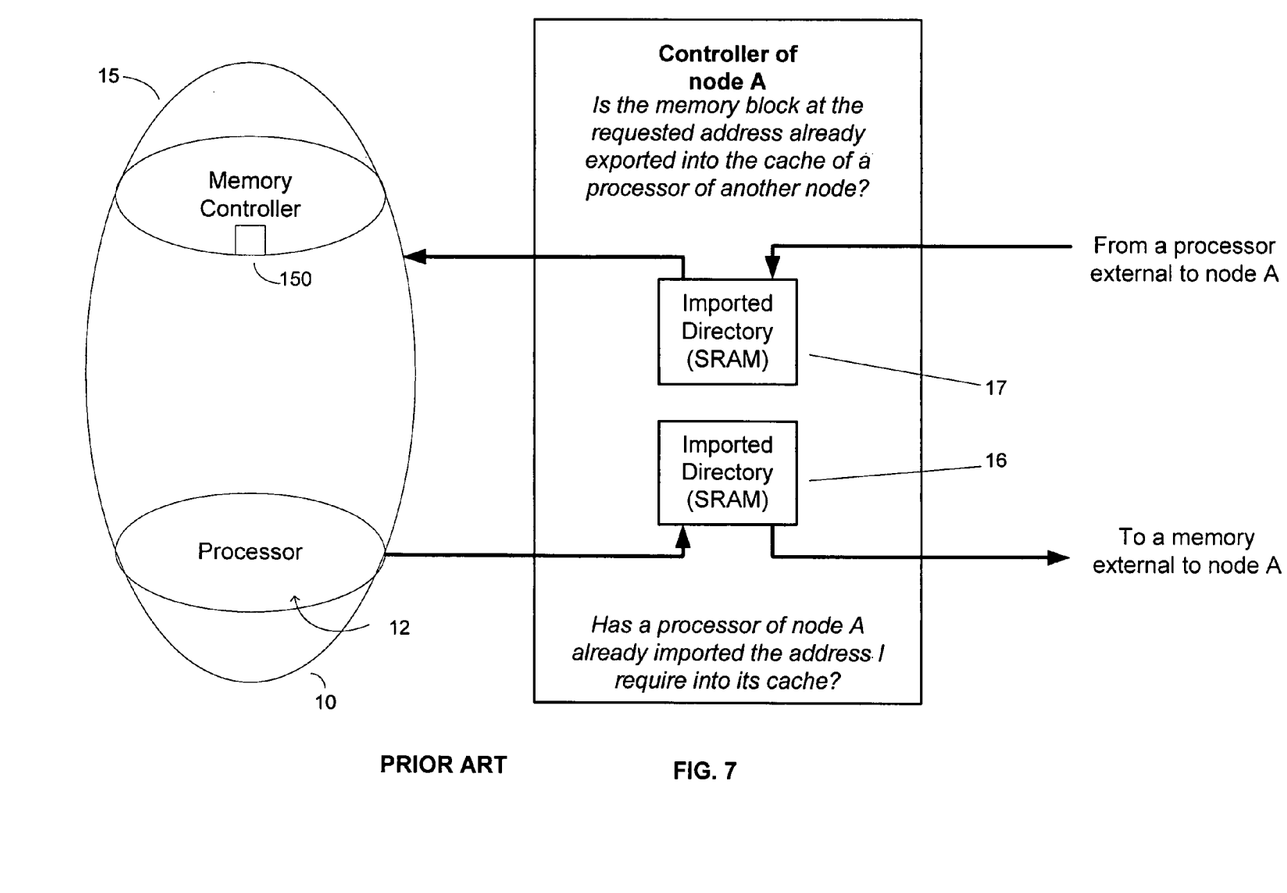
FIG. 7 is a diagram of an embodiment of the prior art illustrating the respective roles of the exported and imported address arrays, implemented in a node controller.

As shown in FIG. 5, the SMP servers known in the prior art typically comprise several nodes (10), each comprising a node controller (20) and connected to each other by an interconnection network (2) between the node controllers (20), for example a communication line of a connector or similar means of communication. The node controllers (20) are coupled for example to an input/output circuit (14) and to several processors (12). Each processor (12) is associated with at least one memory (13). In this type of server known to the prior art, each node controller (20) is equipped with an imported directory (16) and an exported directory (17), as shown in FIGS. 5 and 7. The node controller (20) of each node (10) cooperates with a memory controller (15) managing the memory addresses within the node, using a directory (150) referencing the memory addresses used by the processors (12) within the node (10), as shown in FIG. 5. Within the framework of the cache consistency protocol of an SMP machine, the problem must be faced of a large number of agents to identify within a limited naming space. As a reminder, an agent is an entity that participates in the cache consistency protocol by sending and receiving packets and by applying the appropriate protocol processing to them. There are different types of agents and each agent generally has an identifier that must enable it to be identified uniquely. However, two agents associated with a same processor can share a same identifier if it is possible to systematically differentiate them (different type of agent for example).

The cache consistency protocol, notably the CSI protocol (Common System Interface), enables the use of two packet formats:
the standard header packets, and
the extended header packets.

The advantage of the use of standard header packets is their reduced size. However, their use has the disadvantage of proposing a naming space limited to a certain number of identifiers used to identify the processors, the I/O hubs, the node controllers and the memory controllers. Within the framework of the design of large servers of the SMP type, where the number of agents to identify is large, this limitation requires the system to be divided into nodes each having their own CSI naming space. At the interface of these different nodes is placed a node controller used as a proxy ("mandatory") to the other nodes. With reference to FIGS. 5 and 7, the "controller" (20) thus takes on the name translation role from one naming space to the other.

In order to also face the issue of inflation, in a large SMP server, of the traffic of snoop messages (messages of the cache consistency protocol used to consult the caches of the system susceptible of having a copy of the memory address referenced by an agent in order to determine the status of the data in the cache), a known solution is to mask from the agents within a node (10) the visibility of the agents of the other nodes. This type of solution is appropriate for the dual issue of the high number of agents and the high traffic of snoop messages. Hence, the snoop traffic is prevented from increasing proportionally to the number of processors in the system and the response time to the snoops is prevented from increasing proportionally to the maximum distance between two processors of the system. It must be noted here that this distance can become great in a large SMP server due to the limited connectivity of the processors (12) and possibly the connectivity of the node controllers (20).

This masking is concretely performed in the node controller (20) which is present within the node (10) as a single agent performing accesses to the local addresses (in the name of the processors and input/output hubs external to the node) and as a single memory controller containing all the remote addresses (i.e. the addresses corresponding to the memories external to the node (10) with which it is associated). It is understood here that the adjectives "local" or "remote", with regard to an address, are used according to membership or non-membership of the node (10) considered. In other words, an address is local to a node A if it is hosted in a random access memory module associated with an agent belonging to the node A. Conversely, an address is remote with respect to a node A if it is hosted in a random access memory module associated with an agent not belonging to the node A.

The NC controller (20) thus receives the packets from within or from outside the node (10) as a recipient of the packet. Then it assigns a new identifier to these packets before they pass from within the node to outside or conversely. If all the identifiers of the target naming space have been used, it causes this packet to wait in an internal buffer memory.

With reference to FIG. 7, when an agent sends requests to the memories within the node (10), it is identified in a directory or table (150) of these memory controllers (15). Hence, these memory controllers (15) only have a rough view of the outside of the node (10). They only know that the data has been exported by an agent outside the node (10) without knowing which agent or in which external node it is found.

To implement the snoop filtering, the NC controller (20) of the node (10) implements two cache directories (17, 16), stored in the memory of the node controller (20). A first, called exported directory (17), references the local addresses exported into the processor caches (12) of other nodes and makes it possible to know which nodes exported these addresses. A second, called imported directory (16), references the remote addresses imported into the caches of the processors of the node (10) and makes it possible to know which agents imported these addresses.

To provide acceptable performances, these two memory structures are implemented in RAM memory, this RAM memory notably being able to be implemented using SRAM technology (Static Random Access Memory) in the chip. The tables (17, 16) are then dimensioned proportionally to the sizes of the processor caches. This type of memory is very fast and does not need refreshing. Nevertheless it is also very expensive and voluminous.

A problem that arises in such systems known by the prior art relates to the necessity of a large size of memory allocated to the import and export directories and therefore the extra cost that implementing these directories represents. Hence, when a system comprises a large number of processors, it is necessary the node controllers have a sufficient memory to store all the imported and exported addresses. Indeed, the size of the imported directory of a node must be equal to the sum of the size of all the caches (3) of the processors (12) of this node. Likewise, the size of the export directory of a node must be equal to the sum of the size of all the caches (3) of the processors (12) of all the other nodes of the system.

The system according to the invention aims precisely to avoid the disadvantage of the extra cost when these memory structures require a large size, for example for a large SMP server. It can even be quite simply impossible to implement the quantity of memory necessary (technological limits) by following the type of solution of FIGS. 5 and 7. Hence, the invention, by solving these problems of implementing the memories necessary for these directories, also aims to make it possible to create systems containing a larger number of processors than is allowed by the systems known by the prior art, such as those shown in FIGS. 5 and 7.

It can be recalled that the quantity of memory that it is possible to place in the "cache consistency controller" of an NC controller (120) is limited by:
the process used (etching fineness),
the chosen chip size,
the type of memory implemented (SRAM or DRAM).

Moreover, the choice of placing a part of the memory that the "controller" needs outside the chip generates a "significant" cost in terms of response time that makes this possibility unattractive. The lower performances obtained with a memory external to the chip would therefore limit the applications. Moreover, this type of solution would result in a noticeable increase of the cost of the system (cost of the external memory modules to add to the cost of the chip).

In this context, it is interesting to propose an alternative enabling the disadvantages of the prior art to be overcome. Indeed, a system comprising the 3 types of directory described herein for the systems known by the prior art have the disadvantage of requiring a considerable size of memory at the level of the node controller. In particular, the exported directory contains the memory addresses that were exported to other nodes. It is therefore understood that the more the system comprises a large number of nodes (and processors), the more this exported directory requires a large storage space.

BRIEF SUMMARY OF THE INVENTION

The purpose of the present invention is to overcome one or more of the disadvantages of the prior systems, by proposing a computer system of the SMP (Symmetric Multiprocessing) type with partitions into nodes equipped with node controllers NC, that always ensure the cache consistency and reduce the memory size of the node controllers.

For this purpose, the invention relates to a computer system which according to an illustrated embodiment comprises a plurality of multiprocessor groups, called nodes, in which the data processed is hosted in the memories of the different nodes, the memory addresses used for the hosting of the data being located by the system using a consistency protocol based on the exchange of packets between the different nodes, each of the nodes being associated with a node controller, connected in its node to at least one processor, the nodes being connected to each other by an interconnection network between the said node controllers and each node controller comprising at least one memory associated with a memory controller, at least one of the nodes comprising at least one input/output circuit, at least one of the processors being coupled to at least one memory controller and to a cache memory, where in each determined node of the system, each of the memory controllers comprises a directory associating each of the memory addresses of the determined node with a vector referencing at least one host location for the memory address, within the determined node, called local node, and/or outside the determined node, i.e. in a remote node, the system comprising means for parameterizing the host locations possible in each of the said vectors, and in that the packets exchanged between the nodes contain at least one item of destination information, determined notably from the locations referenced by the said vectors.

Hence, it is advantageously enabled to efficiently manage the packets concerning the remote addresses without requiring in a memory of the node controller a specific directory for the remote addresses that would occupy a non-negligible part of the memory.

According to another particularity, the vector, referencing at least one host location for the memory address with which it is associated, comprises a plurality of presence bit positions, each of the positions corresponding to a host location in the local node or in a remote node.

According to another particularity, each of the interconnection controllers, or node controllers, is formed with its memory in an integrated circuit featuring means for performing a coupling with the other interconnection controllers of the system.

According to another particularity, in a determined node of the system, the associated node controller comprises identification means of a source of incoming packets to this node, arranged to identify at least the transmitter node controller of these packets and to transmit to the associated memory controller the identification information of the transmitter node controller.

According to another particularity, each of the node controllers comprises interpretation means arranged to determine, from the said destination information contained in the packets, the destination location of the memory addresses exported by this node controller.

According to another particularity, the memory controller comprises means for recording the identification information of the transmitter node controller of an incoming packet requiring the exportation of a memory address, these recording means storing this identification information as destination information in the vector corresponding to the memory address for which the exportation is required by the incoming packet.

According to another particularity, in a determined node of the system, the associated node controller comprises at least one imported directory referencing a plurality of remote node memory addresses that have each been imported to a processor of the local node.

According to another particularity, each node controller features routing means using the imported directory of the node controller before routing the outgoing packets of the local node.

According to another particularity, each vector of each of the directories of the memory controllers comprises a plurality of fields corresponding to the possible host locations in the local node and at least one remote node, the fields corresponding to the local node indicating an identifier of the processor using the memory address associated with the vector and the fields corresponding to the remote nodes indicating an identifier of the node controller to which the memory address associated with the vector has been exported.

According to another particularity, the vector comprises data to identify a mode of use of the associated information.

According to another particularity, the said mode for using an item of information is selected from the modes of use allowed by a protocol indicating a status of the data in the memory address associated with the vector, by a use status of the memory address.

According to another particularity, the system forms a server with at least 2 nodes and wherein all the memories are shared between all the processors that use it jointly.

BRIEF DESCRIPTION OF THE SEVERAL VIEWS OF THE DRAWING

The invention, with its characteristics and advantages, will emerge more clearly from reading the description made with reference to the annexed drawings, wherein.

DETAILED DESCRIPTION OF THE INVENTION

Figure 1:
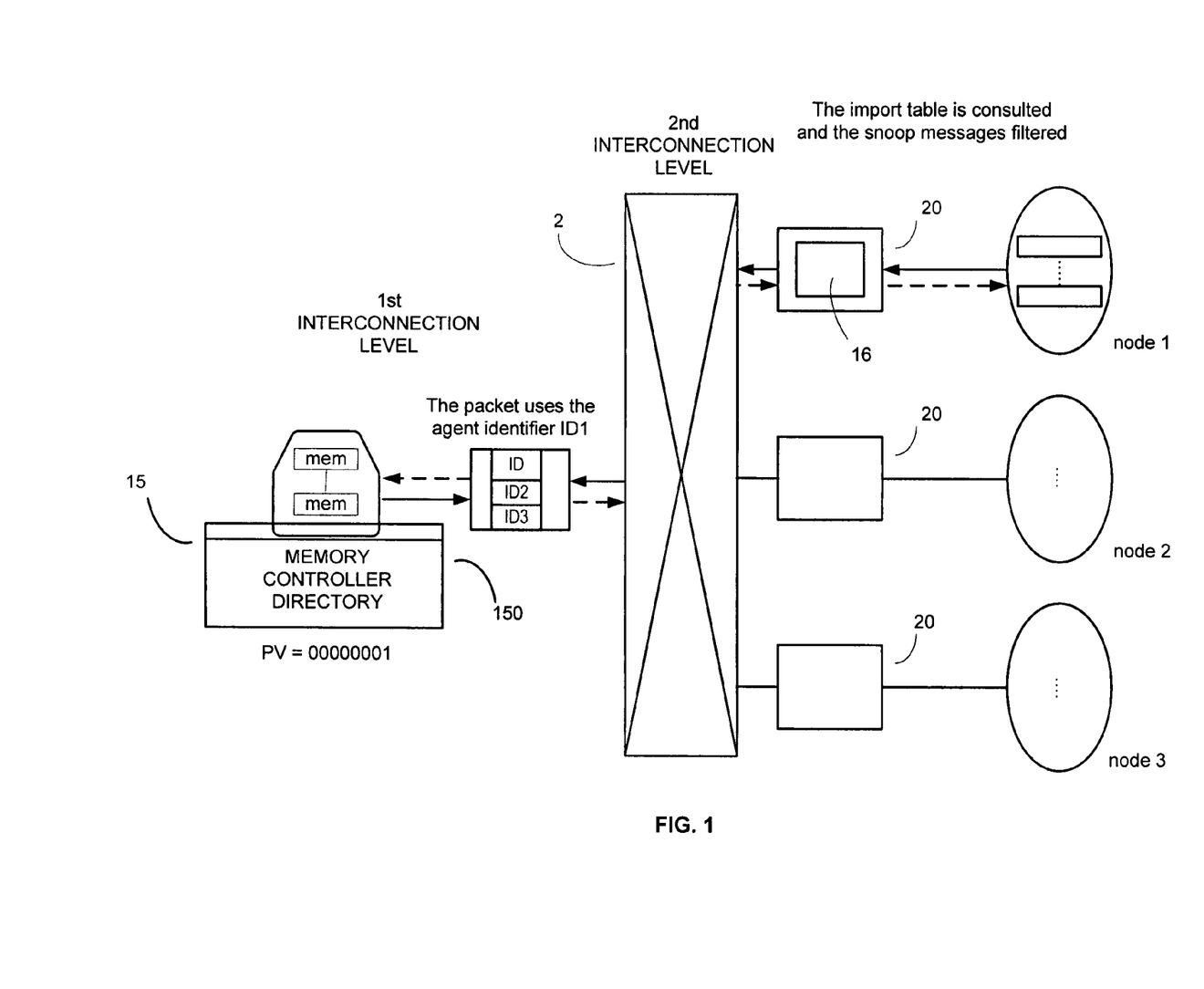
FIG. 1 schematically shows an export operation of a line to a remote node of the computer system according to an illustrated embodiment of the invention, with an update of a table provided in the memory controller.
Figure 3:
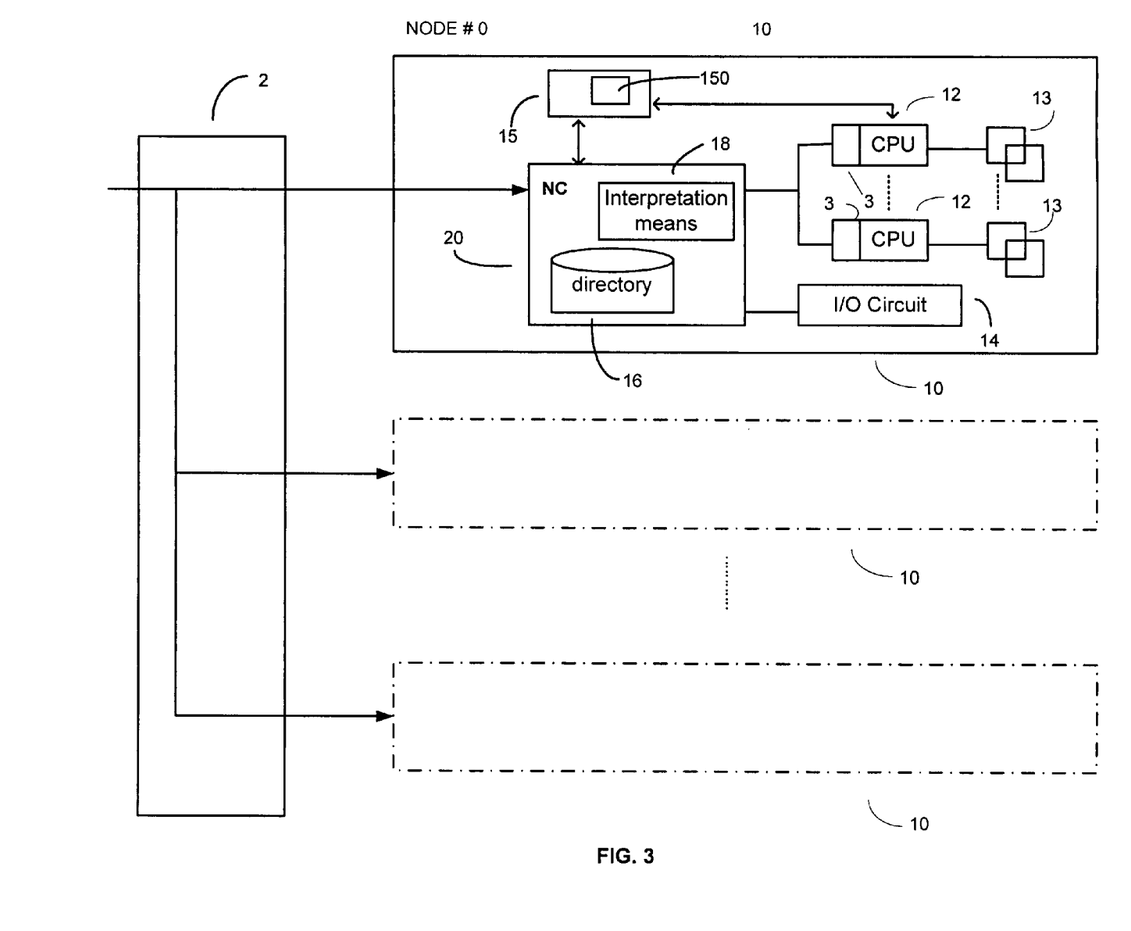
FIG. 3 is a diagram showing a configuration example of a computer system with several nodes according to an illustrated embodiment of the invention.

With reference to FIGS. 1 and 3, the system according to the an illustrated embodiment of the invention is a multiprocessor architecture, for example of the SMP type (symmetric multiprocessing). The system comprises a plurality of multiprocessor groups (10) called nodes (10). A node controller (20) implanted in each of the nodes (10) is connected in its multiprocessor group (10) to at least one processor (12). The nodes (10) are connected to each other by an interconnection network located between the said node controllers (20). Each of the nodes comprises a set of memories (13) associated with a memory controller (15) and at least one processor (12) coupled to at least one memory controller (15) and to a cache memory (3). In the example of figures, each of the nodes (10) comprises at least one input/output circuit (14). Generally, at least one of the nodes (10) of the system comprises at least one input/output circuit (14), that can be shared by the processors of the different nodes. It will be noted incidentally that, according to diverse embodiments of the invention, the memory controller (15) can be integrated into the processor chip, but it can also be implemented on a separate chip, as for example in the case of NovaScale 5005 servers. The memory controller (15) manages the memory addresses within the node (10), using a directory (150) referencing the memory addresses used by the processors (12) within the node (10). In some embodiments, the memory controller (15) comprises as many directories (150) as there are memories (13) in the node (10). It will be noted that the term directory used herein should not be interpreted in a limited manner and can designate a table or an array or any organization suitable to the referencing as described herein.

The computer system according to the illustrated embodiment of the invention presents, in a similar manner to the systems of the prior art described in reference to FIGS. 5 and 7, an architecture with several processors (12) each associated with a set of memories (13). This type of architecture can enable, for the reasons described hereafter, an SMP type machine to be created containing a large number of processors and Input-Output controllers (or interface) (I/O hubs), this type of hub or I/O controller corresponding to a chip that is used as an interface between the CSI domain (approximately equivalent to the memory bus) and the PCI Express domain (Peripheral Component Interconnect Express), the chip forming the Input/Output hub can, moreover, play the role of root for the PCI-Express tree structure.

Figure 2:
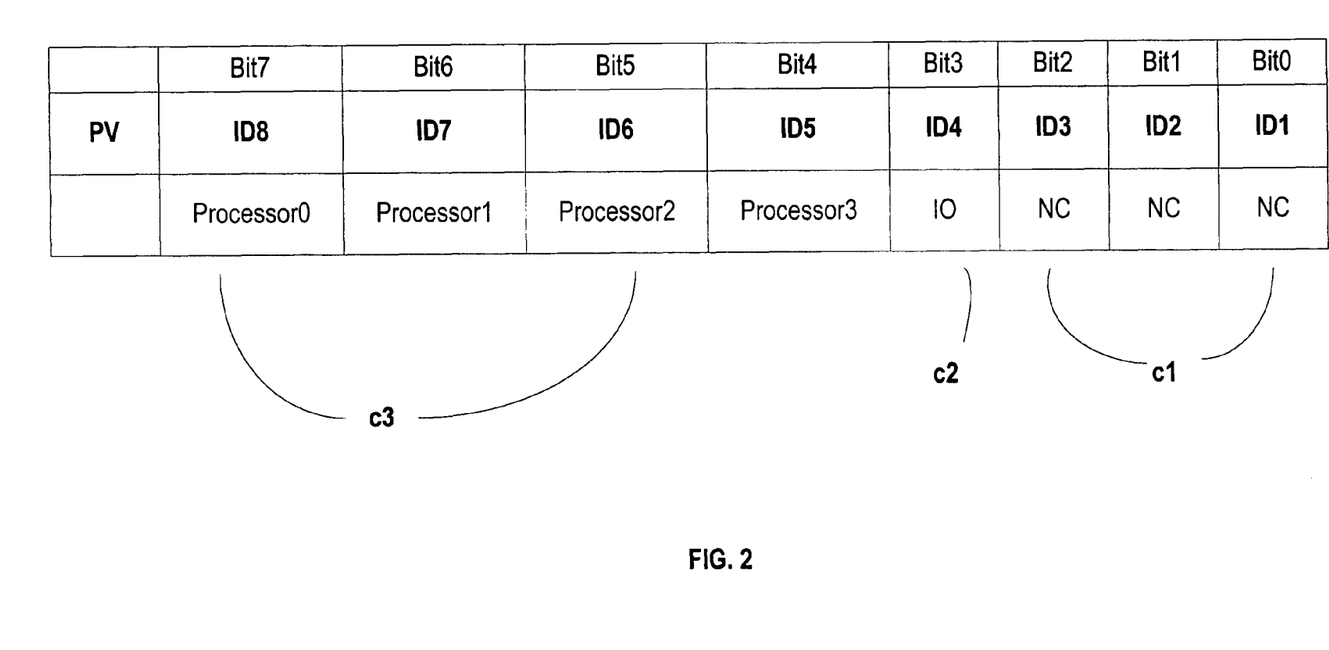
FIG. 2 shows a vector example present in the table of the memory controller of a processor of the system according to an illustrated embodiment of the invention.

With reference to FIGS. 1, 2 and 3, a computer system in accordance with the illustrated embodiment of the invention is arranged to eliminate the need to implement the exported address directory (17) in the node controller (20), to reduce the surface of silicon used. To achieve this, in each defined node (10) of the system, each of the memory controllers (15) comprises a directory (150) for associating each of the memory addresses of the defined node (10) with a presence vector (PV) referencing at least one host location for the memory address, within the defined node (10), called local node (10), and/or exterior to or outside the defined node (10), i.e. in the node (10) called remote. The system according to the illustrated embodiment of the invention comprises means for parameterizing the possible host locations in each of the said vectors (PV). This system according to the invention therefore implements a modified cache consistency protocol not requiring any export directory but in which the memory addresses used are stored in the directories (150) of the memory controllers (15) and more specifically in a presence vector associated with each of the memory addresses of the memories (13) associated with the memory controller (15). This modified consistency protocol uses the packets exchanged between the nodes to locate the data. Another particular aspect of the system according to the illustrated embodiment of the invention consists in providing that the packets exchanged between the nodes (10) contain at least one item of destination information, determined or derived notably from the host locations listed by the said vectors (PV). Hence, the system comprises means for configuring the packets exchanged to include, in the packets sent by a node (10) at least one item of destination information extracted from the information stored in the presence vectors (PV). Likewise, the packets received in a node contain at least one item of information coming from the packet. A configuration of the packets when implemented in the system would enable the monitoring of the sources and destinations of the requests and responses (i.e. of the packets) exchanged between the nodes for the location of the data required by a processor.

It would be obvious to one skilled in the art that any destination information in the packets may be configured to reference nodes individually or in groups with the groupings being configurable within the computer system, possibly at start-up time of the computer system, or reconfigurable for maintenance or reconfiguration during running of the system. It would be obvious to one skilled in the art that the destination information might be encoded in different formats or with different coding schemes at different places in the computer system. It would be obvious to one skilled in the art that not destination information might be needed at all places in the computer system.

The vector (PV) called presence vector is designed to represent the use status of each of the memory addresses of each of the nodes (10). For each defined node (10), this vector is stored in memory, in a directory (150) of at least one of the memory controllers of the defined node (10). In some embodiments of the invention, the presence vector (PV) of each of the directories of the memory controllers of a node can, in a non-limiting manner, be of the form illustrated in FIG. 2 and allows a host location to be referenced for the associated memory address, defined by a position of a presence bit. In the example of FIG. 3, the array (16) of the imported addresses is kept in the controller (20). It is understood that this type of technique according to the invention can prevent adding external memory modules and limiting the quantity of memory implanted on the NC controller (20). The fact of keeping the import directory in certain embodiments of the invention enables the filtering function of the snoop messages to be implemented in such a manner to limit the traffic within the network (2). However, the invention also enables other embodiments in which the import directory is not implemented, in such a manner as to leave the maximum amount of memory space available in the node controllers (20).

The SMP architecture system illustrated in FIG. 3 comprises NCs (20) implementing for example a fast bus and notably the Intel "CSI" protocol to ensure the consistency of the information stored in the memories (13) and the caches (3). In a manner known, this protocol is used in the design of large servers having a computer architecture such as SMP. However, this protocol is modified herein to optimize the storage space used in the chips. Each of the processors (12) is coupled to a memory controller (15) and to a cache memory (3). The cache memory (3) and/or the memory controller (15) can be incorporated or not incorporated into the processor (12).

With reference to FIG. 2, in some embodiments of the invention, it is useful to adapt the use of agent identifiers ID1, ID2 and ID3 by providing, in the presence vector (PV), indicator fields (c1, c2, c3) of agents using the data. In the non-limiting example of FIG. 2, the vector can notably show the status of the data and comprises:

a number of first fields (c1) equal to the number of remote node controllers (20) with respect to the node (10) with which this vector is associated, a number of second fields (c3) equal to the number of local processors (12) (i.e. in the node (10) with which this vector is associated), and at least one field for at least one input/output hub (14) of the local node (10).

A presence bit in one of the first fields (c1) is used to specify that the memory address associated with the vector is hosted at the level of a defined remote node controller (20) among the remote node controllers (20) of the system. It is therefore understood that, contrary to the protocol of the prior art wherein the remote node controllers (20) all appear as being a single and unique exterior agent to the local memory controller (15), each of the remote node controllers (20) are referenced here by the memory controller (15). To achieve this, as mentioned above, the system comprises means for identifying the source of the packets. Hence, a node controller (20) receiving a request from a remote node (10) and querying the memory controller (15), presents itself to the said controller as the source from which the request comes.

More precisely, in some embodiments of the invention, in a defined node (10) of the system, the associated node controller (20) further comprises means for identifying as a source of incoming packets to this node (10), at least the node controller (20) transmitting these packets and operates to send the identification information of this transmitting memory node controller (20) to the associated memory controller (15). Moreover, in some embodiments of the invention, each of the node controllers (20) further comprise interpretation means (18) arranged to determine, from the said destination information contained in the packets, the destination location of the memory addresses exported by this node controller (20). Finally, in some embodiments of the invention, each of the memory controllers (15) further comprises means for recording the identification information of the node controller (20) sending an incoming packet requiring the exportation of a memory address, the recording means storing this identification information as destination information in the vector (PV) corresponding to the memory address for which the exportation is required by the incoming packet.

Moreover, a presence bit in one of the second fields (c3) of the presence vector (PV) allows the memory address associated with the vector to be specified as being hosted at the level of a defined processor among the local processors (12). Hence, the vector (PV), referencing at least one host location for the memory address with which it is associated, comprises a plurality of presence bit positions, each of the bit positions corresponding to a host location in the local node (10) or in a remote node (10).

In a general manner, in diverse embodiments of the invention, each vector (PV) of each of the directories of the memory controllers comprises a plurality of fields corresponding to the possible host locations in the local node (10) and in at least one remote node (10), the fields corresponding to the local node indicating an identifier of the processor (12) using the memory address associated with the vector and the fields corresponding to the remote node indicating an identifier of the node controllers (20) toward which the memory address associated with the vector were exported.

With reference to FIGS. 1 and 3, each of the memory controllers (15) of a defined node (10) of the system has a table (150) associating respectively the vector with a memory address of the set of memories (13) associated with the defined node (10) (local node).

In the example of FIG. 1, the system comprises four nodes, with for example four processors (12), an input/output controller (or hub) (14) and a node controller (20). In this example, each node controller (20) comprises an imported address array (16). In this example, a processor (12) of the node 1 accesses a remote memory address, that is a memory address of a processor of a different node. To be specific, the processor of the node that accesses a memory of the node 0 is shown by the identifier "ID 1" in the node 0. This results from the fact that, from the agents of a node, the full visibility of the agents of the other nodes is masked. The internal agents only have a rough visibility of the external agents, that is: the external agents belonging to a same node are indeed typically represented as a single agent, to which a single identifier generally corresponds, here shown by the identifier of the remote node controller (20). However, the node (or more particularly the node controller here) from which the request comes is identified and this source of the request is maintained up to the time of being stored in the presence vector (PV).

When a processor (12) of the node 2 accesses a memory address of the node 0, the processor (12) of the node 2 will be represented in the same manner by "ID 2" (and a processor of the node 3 by "ID 3"). An intermediate hierarchy is therefore introduced between the local processor (12) and the remote processors. The node controller (20) is the local representative of the processors located in the remote nodes. The node controller (20) is virtually increased by as many agents as there are remote nodes. For each remote node concerned, the node controller (20) that interfaces the local node with the remote node is assigned a different identifier. Hence, the node controller (20) presents itself within the node as several agents.

To return to the example of FIG. 1, the node controller (20) of the node 0 identifies the source of the access request by the position of the presence bit that specifies the identifier ID 1: PV=00000001 (the Bit 0 corresponds to the identifier ID1 as shown in FIG. 2). This type of interpretation can be carried out by the interpretation means (18) of the node controller (20) that interprets the position of the presence bit and enables the node controller (20) to identify the destination taken by the memory addresses that will be exported. The interpretation means (18) is for example implemented at the level of the node controller (20).

In the example of FIG. 1, the data is therefore supplied to the exportation destination, that is to the agent ID1 from the viewpoint of the node 0. The table (150) of the memory controller (15) is updated to memorize that the line is exported by the agent ID1. This update can be carried out by an appropriate parameterization of the position of the presence bit and/or an appropriate parameterization of the vector enabling the local node controller (20) to retrieve at least the exportation destination. In the example of the figures, the parameterizing gives PV=00000001.

This embodiment is not restricted and the vector can take any form appropriate to the referencing described herein. In the example of FIGS. 1 and 2, when a processor (12) of the node 1 accesses the memory in the node 0, it is seen that it is represented by the identifier ID1 in the node controller (20) located in the node 0. The identifier "ID 1" is in this case marked by the bit 0 in the presence vector of the array or table (150) of the memory controller (15), which makes it possible to memorize that the content of the address relative to this presence vector is now found in the node 1. During a future access to this memory address, the node controller (20) will consult the directory (150) of the memory controller (15) and will send a snoop message with "ID 1" as target identifier. It is understood that the three identifiers illustrated in FIG. 2 (ID1, ID2 and ID3) all correspond to the node controller (20) in the routing tables specific to the node (10); and that the node controller (20) will then receive all the snoops targeting the remote agents. The node controller (20) is specifically arranged to decode the destination remote node according to the identifier contained in the received packet. This interpretation of the destination node according to the identifier (the said destination information determined notably from the locations referenced by the said vectors (PV)) makes it possible to chose between the 3 (corresponding in the vector to the first fields ($c_1$)), in the example shown in the figures. It will be noted that the non-limiting examples of the figures show a system with 4 nodes and that the details provided herein refer to these examples but that the teachings of the invention can naturally be adapted to systems comprising at least 2 nodes and that the directories and the identifiers will be adapted to the number of nodes. A node controller (20) is therefore obtained, for example in the form of an ASIC circuit, that does not require any exported directory (17).

Figure 8:
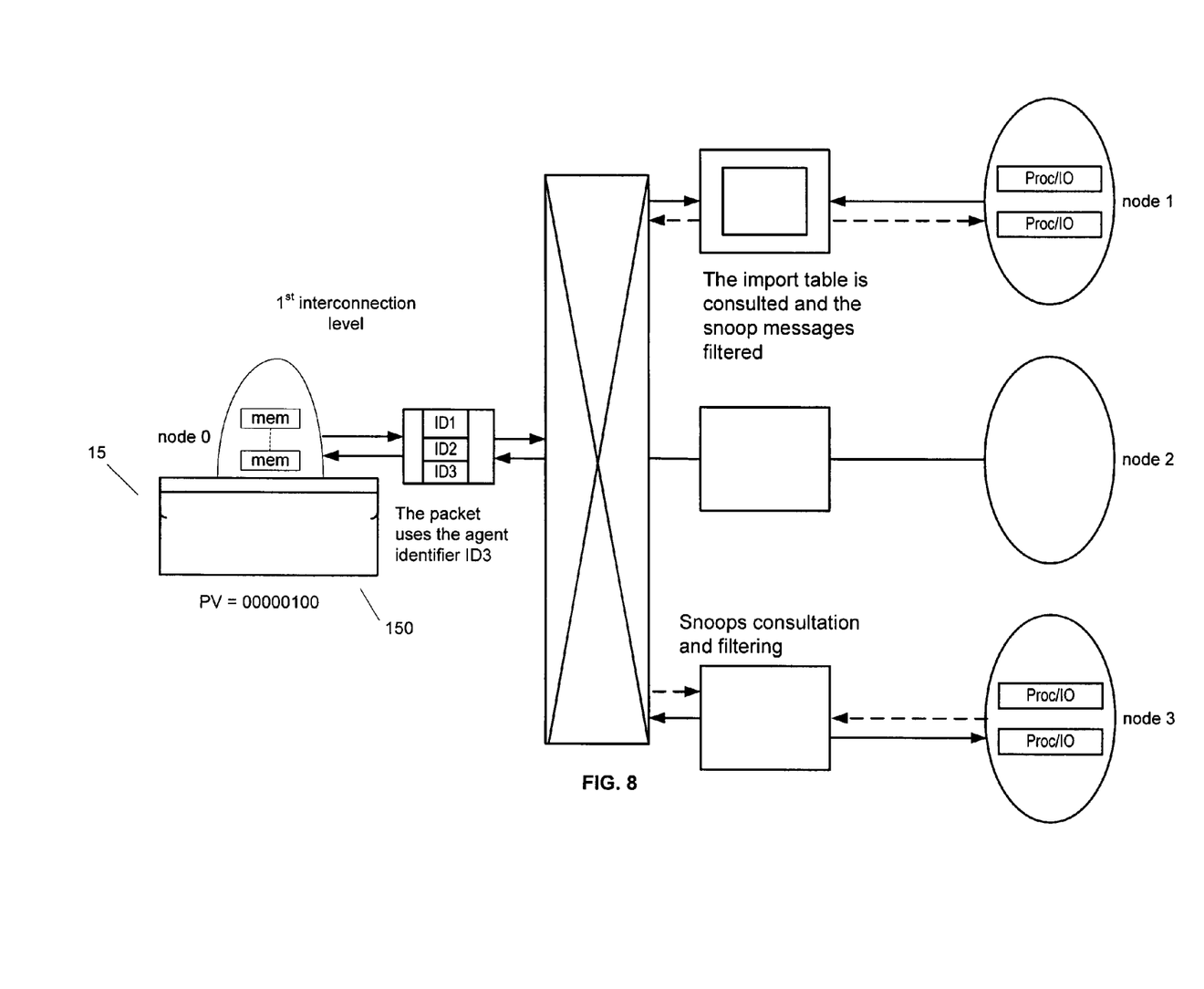
FIG. 8 schematically shows the case of a request by a remote node of a line previously exported to another remote node in an illustrated embodiment of the invention.

FIG. 8 considers the example according to which the node 3 requests the line previously exported in the node 1. By thus using the end of the aforementioned example as illustrated in FIG. 1 (the memory address having been exported from the node 0 to the node 1), when the node 3 wants to access the address previously exported to the node 1, the situation is then as follows: the consultation of the directory (150) in the memory controller (15) at the level of the node 0 enables it to be determined that the data required has been exported into the node shown by the identifier ID 1 (bit 0 of the presence vector). In this case, the data is requested by the node controller (20) of the node 0 as the local representative of the node 3. The initial request formulated from the node 3 having used the identifier of the agent ID 3, the exportation destination is indeed known by the node controller (20). This data is supplied by the node controller (20) of the node 0 as the local representative of the node 1.

At the level of the directory (150) of the memory controller (15), the vector (PV) is updated, as shown in FIG. 8. To achieve this, the memory controller (15) receives the request coming from the agent ID3. After consulting the directory (150), the memory controller (15) informs the node controller (20) that this memory address is marked as being exported in the agent ID1. In one embodiment of the invention, a snoop message is then sent to the agent ID1 at the initiative of the node controller (20) of the node 0. After the item of data is received, the associated vector references the said data item as being exported in the agent ID3: PV=00000100 (position corresponding to the bit 2 in the example of FIG. 2).

It is understood that the node controller (20) can present itself within the node (10) as several agents using its facility of interpreting the identifiers ID1, ID2, ID3 (this being valid at a 1st interconnection level, within a same node). This differentiation into several agents can be used in fact to reference, with a particular identifier, a particular external node (10) exporting a local line. This information is notably stored in the memory controller (15), notably in the directory (150) of the memory controller (15).

Hence, if the memory controller (15) is queried, it is capable of indicating into which remote node (10) the data has been exported. In one embodiment of the invention, this type of differentiation replaces the function of the exported directory of a node controller (20) and enables the removal of this exported directory in the node controller (20). Furthermore, space is thus gained on the chip of the node controller (20). In some embodiments, this free space can be used to implant an imported address array (16) suitable to support the cache memory spaces of larger processors (12).

To maintain good snoop latency and to control the snoop bandwidth, the imported directory (16) can be kept, in some embodiments of the invention. This enables the snoops targeting the interior of a node (10) to be filtered and the latency of these snoops to be improved when they cannot be filtered. This only affects the sub-part processing of the local addresses and does not affect the sub-part of the chip managing the packets concerning the remote addresses. In one embodiment of the invention, the architecture of the component is divided in such a manner as to enable this particular processing mode for the remote addresses.

Figure 4A:
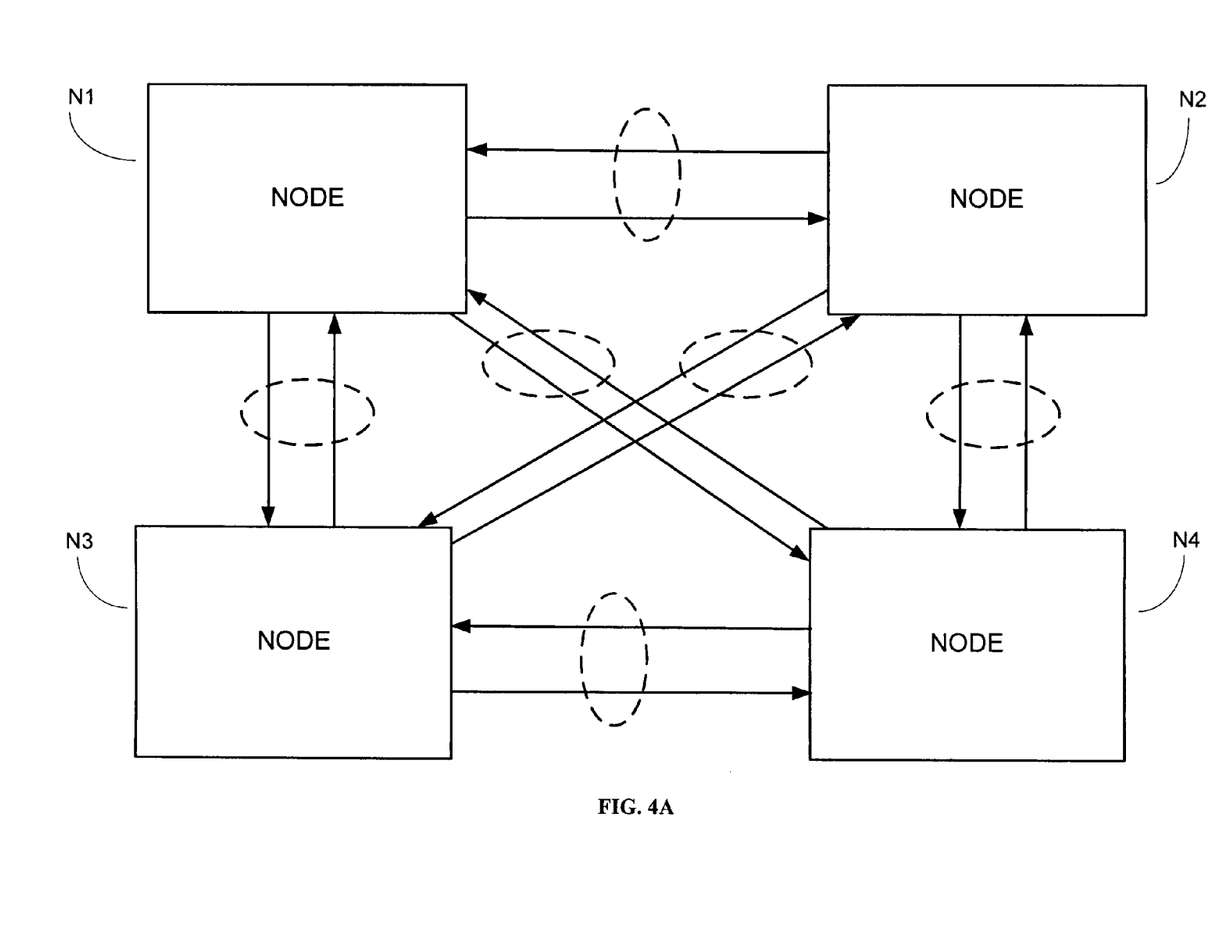
FIG. 4A and FIG. 4B are schematic representations illustrating systems with several nodes being able to implement the techniques of the invention according to diverse embodiments.
Figure 4B:
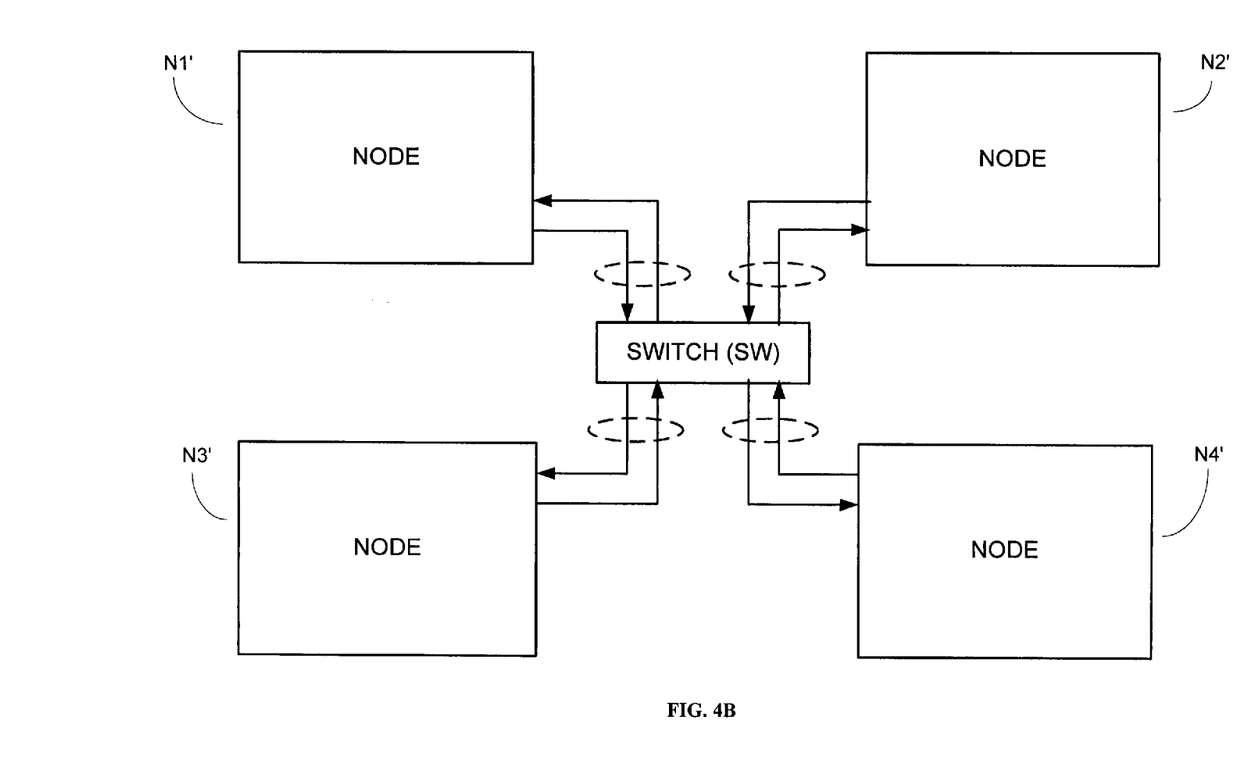

With reference to FIGS. 4A and 4B, it is understood that the SMP architecture used can provide for at least four nodes (N1, N2, N3, N4, N1', N2', N3', N4'). The internal links can be point-to-point links that connect the nodes (N1, N2, N3, N4) of the system directly between each other as illustrated in FIG. 4A. The internal links can also be point-to-point links between the nodes (N1', N2', N3', N4') and a switch (SW), to reduce the number of links. The switch can in this case feature a processor coupled to an interface to ensure the implementation of the cache consistency protocol. Any suitable connection mode can naturally be used for the links between the nodes.

In one embodiment, the presence vector indicates, not the node (10) in which the data is present but the identifier of the processor (12) having the data. Each vector comprises, in this case, fields used to indicate, by the position of a bit or other similar marking, the identifier of the processor (12) using the memory address associated with the vector. The configuration of the presence vector can be adapted as will be appreciated by those skilled in the art.

Moreover, in some embodiments, the vector (PV) comprises data to identify a mode of use of the associated information. The said mode of use of an item of information is chosen from the modes of use allowed by a protocol indicating a status of the data in the memory address associated with the vector, by a use status of the memory address. Hence, for example, a node controller (20) receiving a request from a remote node (10) and querying the memory controller (15) will be able to determine whether a processor of the local node (10) has data in its cache (3) in a status that justifies using one particular memory address rather than another. According to an embodiment of the invention, the presence vector (PV) can comprise an item of information identifying the mode of use of the data, notably by using the MESI protocol defined as:

M=>Modified: The data is only present in the cache considered, and is dirty, that is it has been modified with respect to the value in the storage memory. The line in storage memory must be overwritten by the local version before others can read it, since it is no longer up-to-date.

E=>Exclusive: The data is only present in the cache considered, but is clean, that is it is unchanged with respect to the storage memory.

S=>Shared: Indicates that this line is perhaps in other caches. The set of the nodes or processors using this data item can also be indicated.

I=>Invalid: Indicates that this data is no longer up-to-date.

One of the advantages of the invention is a reduction in the size of memory in each node controller (hence a significant reduction in the surface of silicon used) since it is no longer necessary to implant a voluminous directory of addresses for each item of shared information exported by or to the other nodes. In other words, it is possible to limit the quantity of memory embedded in the chip forming the node controller (20) and thus to bypass the difficulties in placing memory in the node controller (20).

It must be evident for those skilled in the art that the present invention enables embodiments in many other specific forms without moving away from the scope of application of the invention as claimed, the invention not having to be limited to the aforementioned details of the described embodiments. The number of nodes (10) and processors (12) belonging to a same node can thus vary according to the requirements as can be appreciated by those skilled in the art.

Also, it will be appreciated that those skilled in the art might implement design of a computer system with arrangements of structure such that processors and memories are arranged in manner such that they are placed on different boards, cards or nodes in the computer system, while still retaining advantage from application of the present invention. As an example, a node of one design includes a node controller, a memory controller and memories with no processors, while a second node of second design includes processors, a memory controller or equivalent directory structure, a node controller or equivalent structure within the memory controller, and no memories.

What is claimed is:

1. A computer system including a plurality of processors and a plurality of memories, the plurality of memories providing for storage of host memory data divided into blocks of host memory data, the processors and the memories being distributed among a plurality of individual nodes, the plurality of individual nodes being connected by an interconnection network;

the host memory data being referenced by a host memory address used for locating the blocks of host memory data each stored in a memory data block host location in one or more of the nodes and located using a memory consistency protocol, the memory consistency protocol utilizing an exchange of memory consistency control packets sent between at least two of the plurality of individual nodes, each individual node comprising:

A) a multiprocessor group including a plurality of the processors;

B) a cache memory containing cached blocks of host memory data;

C) local memories within this individual node which are included in the plurality of memories of the computer system;

D) a node controller and a memory controller;

E) the node controller connected to the multiprocessor group and to the memory controller, the node controller including an imported directory for tracking any block of host memory data imported to any cache memory of this individual node;

F) the memory controller connected for controlling the local memories within this individual node, the memory controller including a memory controller directory, the memory controller directory providing, within each storage location of the memory controller directory, storage of a presence vector, each presence vector providing for reference to any number, from one to all, of all possible memory data block host locations; and, G) means for enabling that the memory consistency control packets exchanged between the nodes within the computer system include an item of destination information derived from the presence vector.

2. The computer system of claim 1 wherein the imported directory of the node controller further comprises storage means related to destination information derived from the presence vector, not necessarily in the same form as in the memory controller directory, for tracking any blocks of host memory data stored in the individual node.

3. The computer system according to claim 1, wherein the presence vector references at least one host location for the host memory address with which it is associated and comprises a plurality of presence bit positions, each of the positions corresponding to a host location in the local node or in the remote node.

4. The computer system according to claim 1, wherein each of the node controller is formed with its memories in an integrated circuit featuring means for performing a coupling with the other node controllers of the system.

5. The computer system according to claim 1, wherein the memory controller comprises means for recording identification information of a transmitter node controller of an incoming packet requiring the exportation of a specified host memory address, the recording means storing this identification information as destination information in the presence vector corresponding to the specified host memory address for which the exportation is required by the incoming packet.

6. The computer system according to claim 1, wherein each node controller further includes routing means using the imported directory of the node controller before routing the outgoing packets of the local node.

7. The computer system according to claim 1, wherein each presence vector of each of the memory controller directories comprises a plurality of fields corresponding to the possible host locations in the local node and at least one remote node, the fields corresponding to the local node indicating an identifier of the processor using the host memory address associated with the presence vector and the fields corresponding to the remote nodes indicating an identifier of the node controller to which the memory address associated with the presence vector has been exported.

8. The computer system according to claim 1, wherein the presence vector comprises data to identify a mode of use of the associated information.

9. The computer system according to claim 8, wherein the said mode of use of an item of information is chosen from the modes of use allowed by a protocol indicating a status of data in the host memory address associated with the presence vector, by a use status of the host memory address.

10. The computer system according to claim 8, forming a server with at least 2 nodes and wherein the number of memories of at least one node are shared between all the processors of the node.

11. A computer system including: a plurality of nodes, each node comprising multiprocessor groups, in which host memory data is hosted in memories of the nodes, the host memory data referenced by host memory block addresses and located with regards to coherency within the plurality of nodes of the computer system using a memory consistency protocol based on an exchange of memory consistency packets between the plurality of nodes, at least some of the plurality of nodes further including a node controller, connected in its node to at least one processor, the nodes being connected to each other by an interconnection network between the said node controllers and each comprising at least one memory associated with a memory controller, at least one of the nodes comprising at least one input/output circuit, at least one of the processors being coupled to at least one memory controller and to a cache memory; in a plurality of determined nodes of the plurality of nodes of the system each of the memory controllers comprising a directory associating each of the host memory block addresses of the determined node associated with a presence vector capable of referencing one, more than, or all possible host locations for the memory address and the memory consistency packets exchanged between the nodes including at least one item of destination information determined notably from the said presence vectors.

12. The computer system according to claim 11, wherein the presence vector, referencing at least one host location for the memory address with which it is associated, comprises a plurality of presence bit positions, at least one position corresponding to a host location in a local node and further positions corresponding to a host location for each remote node.

13. The computer system according to claim 12, wherein each of the node controllers is formed with its memory in an integrated circuit featuring means for performing a coupling with the other node controllers of the system.

14. The computer system according to claim 12, wherein, in the determined node of the system, the node controller comprises identification means of a source of incoming packets to this determined node, arranged to identify at least a transmitter node controller of these packets and to transmit to the memory controller information relating to identification of the transmitter node controller.

15. The computer system according to claim 12, wherein each node controller comprises interpretation means arranged to determine, from the destination information contained in the packets, a destination location of the memory addresses exported by this node controller.

16. The computer system according to claim 14, wherein the memory controller comprises means for recording the identification of the transmitter node controller of any incoming packet requiring the exportation of a memory address, these recording means storing this identification as destination information in the presence vector corresponding to the memory address for which the exportation is required by the incoming packet.

17. The computer system according to claim 11, wherein at least one node controller comprises at least one imported directory referencing a plurality of remote node memory addresses that have each been imported to any processor of the local node.

18. The computer system according to claim 17, wherein in at least one node the associated node controller features routing means using the imported directory of the associated node controller before routing an outgoing packet of the node.

19. The computer system according to claim 11, wherein each presence vector of each of the directories of the memory controllers comprises a plurality of fields corresponding to possible host locations in the local node and at least one remote node, the fields corresponding to the local node indicating an identifier of any processor of the local node using the memory address associated with the presence vector, and the fields corresponding to the remote nodes indicating an identifier of the node controller to which the memory address associated with the presence vector has been exported.

20. The computer system according to claim 11, wherein the presence vector comprises data to identify a mode of use of the associated memory data.

21. The computer system according to claim 20, wherein the said mode of use information is chosen from the modes of use allowed by a protocol indicating a status of the memory data in the memory address associated with the presence vector.

22. The computer system according to claim 11, forming a server with at least two nodes, a first node and a second node, and wherein at least one of the memories of one of the two nodes is shared between at least one processor of the first node, and at least one processor of the second node.

23. A method of constructing a computer system which reduces the amount of directory storage required in implementing a memory consistency protocol within the computer system wherein the computer system comprises a plurality of processors and a plurality of memories, the plurality of memories providing for storage of blocks of host memory data, the processors and the memories being distributed among a plurality of individual nodes, the individual nodes being connected by an interconnection network; the host memory data being referenced by a host memory address used for locating the blocks of host memory data stored in a host location in one or more of the individual nodes using a memory consistency protocol, the memory consistency protocol utilizing an exchange of memory consistency control packets sent between at least two individual nodes included within the plurality of individual nodes, the method comprising the steps of:

A) including in each of the two individual nodes, a number of the processors, a cache memory for containing cached blocks of host memory data, a number of memories which are included in the plurality of memories of the computer system;

B) further including in each of the two individual nodes, a memory controller, the memory controller comprising a memory controller directory which contains information relating to the memory consistency protocol for the blocks of host memory data stored in any of the memories of this individual node and in any cache memory of this individual node;

C) further including in each of the two individual nodes a node controller, the node controller being connected to the multiprocessor group and to the memory controller, the node controller including an imported directory for tracking any block of host memory data imported to any cache memory of this individual node;

D) including, within the memory controller, directory storage for a presence vector, each presence vector associated with each block of host memory data stored in this individual node, E) providing for storing information within in each presence vector information providing reference to one, more than one, or all host locations for the memory address within at least one of the plurality of individual nodes;

F) including an item of destination information derived from the presence vector referencing the host location in the memory consistency control packets exchanged between the individual nodes within the computer system for implementing the memory consistency protocol.

* * * * *